United States Patent Office

3,305,504
Patented Feb. 21, 1967

3,305,504
COATING COMPOSITIONS CONTAINING
ORGANOSILICON COPOLYMERS
Dexter P. Huntington, Tonawanda, N.Y., assignor to
Union Carbide Corporation, a corporation of New
York
No Drawing. Filed Jan. 12, 1965, Ser. No. 425,053
31 Claims. (Cl. 260—29.2)

This application is a continuation-in-part of application Serial No. 168,513, filed January 24, 1962, now abandoned.

This invention relates to coating compositions containing organosilicon copolymers.

In general, coating compositions (e.g. paints, lacquers and varnishes) are composed of an organic compound capable of forming a polymeric coating (e.g. a vinyl chloride resin) mixed with a liquid diluent (i.e. water or a liquid organic diluent). Many such coating compositions (e.g. aqueous vinyl halide latices) are produced by polymerizing a monomer that has been emulsified with or suspended in a liquid diluent to produce a coating-forming polymer in the diluent. It is known that the latter-mentioned coating compositions are oftentimes difficult to prepare owing to the incompatibility of the monomer or polymer and the diluent. Similarly, the problem of incompatibility of components of coating compositions often exists in compositions produced by mixing pre-formed coating-forming polymers and diluents. In coating compositions produced by any of the above-mentioned techniques, additional incompatibility problems are often presented by the tendency of pigments in the composition to separate from the other components ("float"). Although compatibility of these various components may be achieved to some extent by the use of various additives (e.g. emulsifying agents), the resulting coating compositions are oftentimes still not satisfactory owing to their poor viscosity characteristics. That is, some coating compositions are too fluid and tend to flood the surface to be coated while other coating compositions are too viscous and must be diluted in order to be spread readily over the surface to be coated. Moreover, many coating compositions foam excessively, particularly when heated. Other coating compositions do not adequately wet the surface to be coated while some coating compositions have poor leveling properties and still others produce coatings marred by "fisheyes."

It is an object of this invention to provide coating compositions whose preparation or use is free of one or more of the above-mentioned difficulties encountered in the preparation and use of conventional coating compositions.

This invention is based, in part, on the discovery that block copolymers containing a siloxane moiety linked to a polyoxyalkylene moiety by a silicon to carbon bond overcome the above-mentioned problems involved in the production and use of coating compositions. This invention provides a coating composition comprising (1) from 1 to 50 parts by weight of an organic compound capable of forming a polymeric coating, (2) from 0.001 to 30 parts by weight of a block copolymer composed of (a) at least one siloxane block containing at least two siloxane units represented by the formula:

$$R_bSiO_{4-b/2}$$

wherein R contains from one to about twenty-two carbon atoms inclusive and is selected from the class consisting of monovalent hydrocarbon groups and divalent hydrocarbon groups and $b$ has a value from 1 to 3 inclusive, said siloxane block containing at least one of said siloxane units wherein at least one R group is a divalent hydrocarbon group, and (b) at least one oxyalkylene block containing at least two oxyalkylene groups represented by the formula —R'O—, wherein R' is an alkylene group containing from two to about ten carbon atoms inclusive, said siloxane and oxyalkylene blocks being interconnected by said divalent hydrocarbon group, and (3) from 20 to 98.999 parts by weight of a liquid diluent, selected from the group consisting of water and liquid organic diluents, said parts by weight being based on 100 parts by weight of the composition.

The copolymers useful in the compositions of this invention are of the class that are known as "block" copolymers. Block copolymers are composed of at least two sections or blocks, at least one section or block composed of one type of recurring units or groups (e.g., siloxane groups as in the copolymers useful in this invention) and at least one other section or block composed of a different type of recurring units or groups (e.g., oxyalkylene groups as in the copolymers useful in this invention). Block copolymers can have linear, cyclic or branched (crosslinked) structures.

The siloxane blocks in the copolymers employed in the compositions of this invention contain at least two siloxane groups that are represented by the formula:

$$R_bSiO_{4-b/2} \qquad (1)$$

wherein R is a monovalent hydrocarbon group or a divalent hydrocarbon group and $b$ has a value from 1 to 3 inclusive. Preferably, R contains from 1 to about 22 carbon atoms inclusive. The groups represented by R can be the same or different in any given siloxane group or throughout the siloxane block, and the value of $b$ in the various siloxane groups in the siloxane block can be the same or different. The divalent hydrocarbon groups represented by R link the siloxane block to the oxyalkylene block. Each siloxane block contains at least one group represented by formula (1) wherein at least one group represented by R is a divalent hydrocarbon group. The siloxane block has a ratio of hydrocarbon groups to silicon atoms from 1:1 to 3:1 inclusive.

Illustrative of the monovalent hydrocarbon groups that are represented by R in Formula 1 are the alkenyl groups (for example, the vinyl and the allyl group); the cycloalkenyl groups (for example, the cyclohexenyl group); the alkyl groups (for example, the methyl, ethyl, isopropyl, octyl and dodecyl groups); the aryl groups (for example, the phenyl and naphthyl groups); the aralkyl groups (for example, the benzyl and the phenylethyl groups); the alkaryl groups (such as the styryl, tolyl and n-hexylphenyl groups), and the cycloalkyl groups (for example, the cyclohexyl group).

Illustrative of the divalent hydrocarbon groups represented by R in Formula 1 are the alkylene groups (such as the methylene, ethylene, propylene, butylene, 2,2-dimethyl-1,3-propylene and decylene groups), the arylene groups (such as the phenylene and p,p'-diphenylene groups), and the alkarylene groups (such as the phenylethylene group). Preferably, the divalent hydrocarbon group is an alkylene group containing from two to four successive carbon atoms. Siloxane groups containing divalent hydrocarbon groups as substituents are illustrated by groups having the formulas:

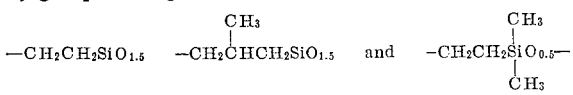

These divalent hydrocarbon groups are linked to a silicon atom of the siloxane block by a silicon-to-carbon bond and to an oxygen atom of the oxyalkylene block by a carbon-to-oxygen bond.

The siloxane block can contain siloxane groups that are represented by Formula 1 wherein either the same hydrocarbon groups are attached to the silicon atoms (e.g., the dimethylsiloxy, diphenylsiloxy and diethylsiloxy groups) or different hydrocarbon groups are attached to the silicon atoms (e.g., the methylphenylsiloxy, phenylethylmethylsiloxy and ethylvinylsiloxy groups).

The siloxane block in the copolymers useful in the compositions of this invention can contain one or more types of siloxane groups that are represented by Formula 1 provided that at least one group has at least one divalent hydrocarbon substituent. By way of illustration, only ethylenemethylsiloxy groups $$[-C_2H_4-\underset{\underset{|}{CH_3}}{Si}O]$$

can be present in the siloxane block or the siloxane block can contain more than one type of siloxane group, e.g., the block can contain both ethylene methylsiloxy groups and diphenylsiloxy groups, or the block can contain ethylenemethylsiloxy groups, diphenylsiloxy groups and diethylsiloxy groups.

The siloxane block contained in the copolymers useful in the compositions of this invention can contain trifunctional siloxane groups (e.g., monomethylsiloxane groups, $CH_3SiO_{1.5}$), difunctional siloxane groups (e.g., dimethylsiloxane groups, $(CH_3)_2SiO-$), monofunctional siloxane groups (e.g., trimethylsiloxane groups, $(CH_3SiO_{0.5})$, or combinations of these types of siloxane groups having the same or different substituents. Due to the functionality of the siloxane groups, the siloxane block can be predominantly linear or cyclic or crosslinked or it can have combinations of these structures.

The siloxane block contained in the copolymers useful in the compositions of this invention can contain organic end-blocking or chain terminating organic groups, in addition to the monofunctional siloxane chain terminating groups encompassed by formula 1. By way of illustration, the siloxane block can contain such organic end-blocking groups as the hydroxyl group, the aryloxy groups (such as the phenoxy group), the alkoxy groups (such as the methoxy, ethoxy, propoxy and butoxy groups), the acyloxy groups (such as the acetoxy group), and the like.

The siloxane blocks in the copolymers useful in the compositions of this invention contain at least two siloxane groups that are represented by Formula 1. Preferably, the siloxane blocks contain a total of from five to twenty siloxane groups that are represented by Formula 1. That part of the average molecular weight of the copolymer that is attributable to the siloxane blocks can be as high as 50,000 but preferably it is from 220 to 20,000. If that part of the average molecular weight of the copolymer that is attributable to the siloxane blocks exceeds 50,000 or if the siloxane blocks contain a total of more than twenty siloxane groups that are represented by Formula 1, the copolymers are usually not as useful, e.g., they may be too viscous for convenient use in the formulations of this invention.

A siloxane block can contain, in addition to the groups represented by Formula 1, siloxane groups represented by the formula:

$$R_e Si O_{\frac{4-(e+f)}{2}} \underset{|}{\overset{H_f}{|}} \qquad (1\text{-}a)$$

wherein R has the meaning defined in Formula 1, $e$ has a value from 0 to 2 inclusive, $f$ has a value from 1 to 3 inclusive and $(e+f)$ has a value from 1 to 3 inclusive.

The oxyalkylene blocks in the copolymers employed in the compositions of this invention each contain at least two oxyalkylene groups that are represented by the formula:

$$[-R'O-] \qquad (2)$$

wherein R' is an alkylene group. Preferably, the alkylene group represented by R' in formula 2 contains from two to about ten carbon atoms inclusive, and most preferably from two to three carbon atoms. Illustrative of the oxyalkylene groups that are represented by Formula 2 are the oxyethylene, oxy-1,2-propylene, oxy-1,3-propylene, oxy-2,2-dimethyl-1,3-propylene, oxy-1,10-decylene groups, and the like.

The oxyalkylene blocks in the copolymers useful in the compositions of this invention can contain one or more of the various types of oxyalkylene groups represented by Formula 2. By way of illustration, the oxyalkylene blocks can contain only oxyethylene groups or only oxypropylene groups or both oxyethylene and oxypropylene groups, or other combinations of the various types of oxyalkylene groups represented by Formula 2.

The oxyalkylene blocks in the copolymers employed in the compositions of this invention can contain organic end-blocking or chain terminating groups. By way of illustration, the oxyalkylene blocks can contain such end-blocking groups as the hydroxy group, the aryloxy group (such as the phenoxy group), the alkoxy groups (such as the methoxy, ethoxy, propoxy and butoxy groups), alkenyloxy groups (such as the vinyloxy and the allyloxy groups). Also, a single group can serve as an end-blocking group for more than one oxyalkylene block. For example, the glyceroxy group,

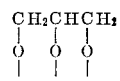

can serve as an end-blocking group for three oxyalkylene chains. The oxyalkylene blocks can also contain trihydrocarbonsiloxy end-blocking groups (i.e. $R_3SiO_{0.5}$).

The oxyalkylene blocks in the copolymers useful in the compositions of this invention each contain at least two oxyalkylene groups that are represented by Formula 2. Preferably, each block contains from four to thirty of such groups. That part of the average molecular weight of the copolymer that is attributable to the oxyalkylene blocks can vary from 88 [for $(C_2H_4O)_2$] to 200,000, but preferably it is from 88 to 15,000. Provided that each oxyalkylene block contains at least two oxyalkylene groups represented by Formula 2, the number of oxyalkylene groups and that part of the average molecular weight of the copolymer that is attributable to the oxyalkylene blocks is not critical, but those copolymers in which that part of the average molecular weight that is attributable to the oxyalkylene blocks exceeds 200,000 or that contain more than fifty oxyalkylene groups per block are less useful, eg., they are too viscous for convenient use in the formulations of this invention.

The copolymers useful in the compositions of this invention can contain siloxane blocks and oxyalkylene blocks in any relative amount. In order to possess desirable properties, the copolymer should contain from 5 parts by weight to 95 parts by weight of siloxane blocks and from 5 parts by weight to 95 parts by weight of oxyalkylene blocks per 100 parts by weight of the copolymer. Preferably, the copolymers contain 5 parts by weight to 50 parts by weight of the siloxane blocks and from 50 parts by weight to 95 parts by weight of the oxyalkylene blocks per 100 parts by weight of the copolymer.

The copolymers useful in the compositions of this invention can contain more than one of each of the blocks and the blocks can be arranged in various configurations such as linear, cyclic or branched configurations. By way of illustration, the following classes of compounds are among the siloxane-oxyalkylene block copolymers useful in the formulations of this invention:

(A) Copolymers that contain at least one unit that is represented by the formula:

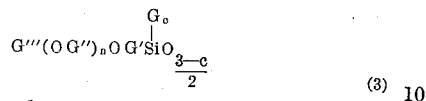

(3)

(B) Copolymers that contain at least one unit that is represented by the formula:

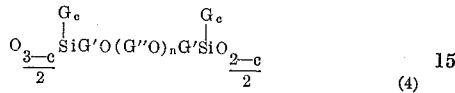

(4)

(C) Copolymers that contain at least one unit that is represented by the formula:

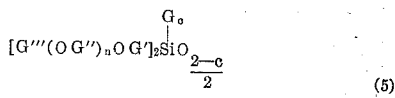

(5)

In the above Formulas 3, 4 and 5, G is a monovalent hydrocarbon radical, G' is a divalent hydrocarbon radical, G'' is an alkylene radical containing at least two carbon atoms, G''' is a hydrogen atom or a monovalent hydrocarbon radical free of aliphatic unsaturation, and $n$ is an integer having a value of at least four, and $c$ has a value from 0 to 2 inclusive in Formulas 3 and 4 and a value from 0 to 1 inclusive in Formula 5. In Formulas 3, 4 and 5, G can represent the same or different radicals, $n$ preferably has a value from 2 to 30 inclusive and G'' can represent the same or different radicals, i.e., the group $(OG'')_n$ can represent, for example, the groups: $-(OC_2H_4)_p-$, $-(OC_2H_4)_p(OC_3H_6)_q-$, $-(OC_3H_6)_p-$ or $(OC_2H_4)_p(OC_8H_{16})_q-$, where $p$ and $q$ are integers having a value of at least one.

The monovalent hydrocarbon radicals represented by G in formulas 3, 4 and 5 can be saturated or olefinically unsaturated or can contain benzenoid unsaturation. Illustrative of the monovalent hydrocarbon radicals represented by G are the linear aliphatic radicals (e.g., the methyl, ethyl and decyl radicals), the cycloaliphatic radicals (e.g., the cyclohexyl and the cyclopentyl radicals), the aryl radicals (e.g., the phenyl, tolyl, xylyl and naphthyl radicals), the aralykyl radicals (eg., the benzyl and beta-phenylethyl radicals), the unsaturated linear aliphatic radicals (e.g., the cyclohexenyl radical).

Preferably, the G and G' groups [included in the definition of R in Formulas 1 and 1–a above] contain from one to about 22 carbon atoms inclusive and the G'' groups [included in the definition of R' in Formula 2 above] contain from two to about ten carbon atoms. When the G''' group is a monovalent hydrocarbon radical free of aliphatic unsaturation it preferably contains from one to about twelve carbon atoms.

Illustrative of the divalent hydrocarbon radicals represented by G' in Formulas 3, 4 and 5 are the alkylene radicals (e.g., the methylene, ethylene, 1,3-propylene, 1,4-butylene and 1,12-dodecylene radicals) the arylene radicals (e.g., the phenylene radical) and the alkarylene radicals (e.g., the phenylethylene radicals). In Formulas 3, 4 and 5, G' is preferably an alkylene radical containing at least two carbon atoms.

Illustrative of the alkylene radicals containing at least two carbon atoms represented by G'' in Formulas 3, 4 and 5 are the ethylene, 1,2-propylene, 1,3-propylene, 1,6-hexylene, 2-ethylhexylene-1,6 and 1,12-dodecylene radicals.

Illustrative of the radicals represented by G''' in Formulas 3, 4 and 5 are the saturated linear or branched chain aliphatic hydrocarbon radicals (e.g., the methyl, ethyl, propyl, n-butyl, tert.-butyl and decyl radicals), the saturated cycloaliphatic hydrocarbon radicals (e.g. the cyclopentyl and cyclohexyl radicals), the aryl hydrocarbon radicals (e.g. the phenyl, tolyl, naphthyl and xylyl radicals), and the aralkyl hydrocarbon radicals (e.g., the benzyl and beta-phenylethyl radicals).

The following are representative of the hydrolytically stable siloxane-oxyalkylene block copolymers useful in the compositions of this invention. In the formulas, Me represents methyl ($CH_3$—), Et represents ethyl ($CH_3CH_2$—), $\phi$ represents phenyl ($C_6H_5$—), and $x$ is an integer. Where the formula represents a unit of a polymer, it is understood that the polymer is terminated by end-blocking groups of the type described hereinabove.

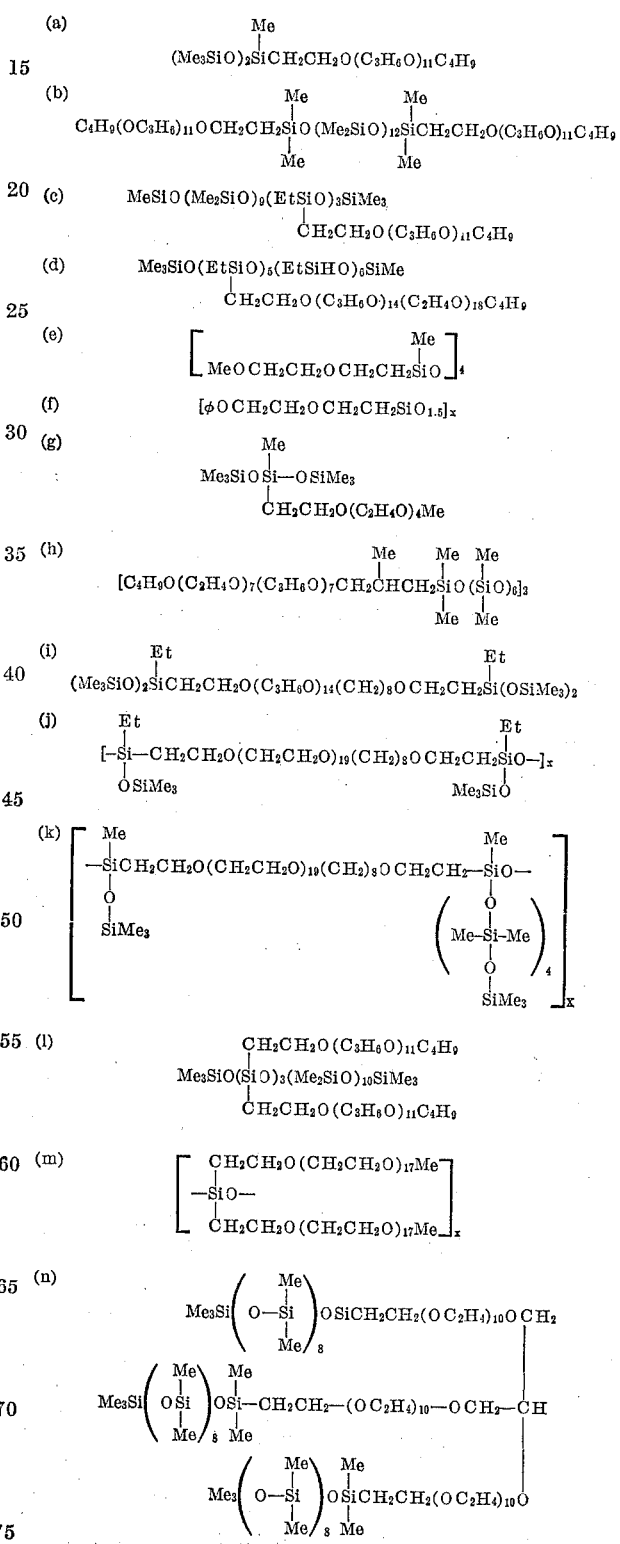

(o)

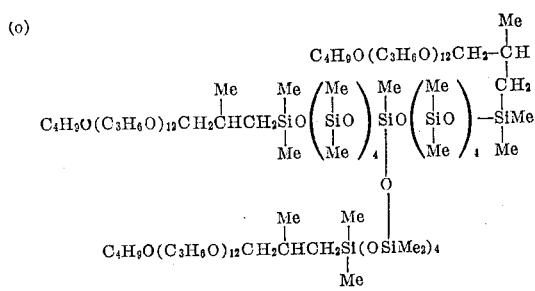

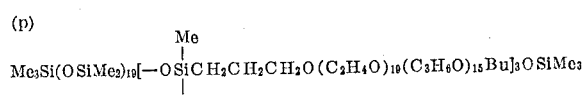

(p)

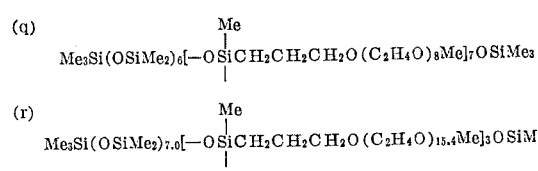

(q)

Me₃Si(OSiMe₂)₆[—OṠiCH₂CH₂CH₂O(C₂H₄O)₈Me]₇OSiMe₃
           |
           Me (r)

Me₃Si(OSiMe₂)₇.₀[—OṠiCH₂CH₂CH₂O(C₂H₄O)₁₅.₄Me]₃OSiMe₃
           |
           Me

As used herein, Bu denotes the butyl group, (C₄H₉—).

Block copolymers that are especially suited for use in the compositions of this invention are those having the formula:

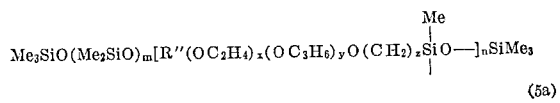

(5a)

wherein Me is a methyl group, $m$ has a value from 0 to 25 inclusive, $n$ has a value from 1 to 10 inclusive, $x$ has a value from 4 to 60 inclusive, $y$ has a value from 0 to 25 inclusive, $z$ has a value from 2 to 3 inclusive and R″ is an alkyl group containing from 1 to 4 carbon atoms inclusive.

The siloxane-oxyalkylene block copolymers useful in the compositions of this invention can be prepared by several convenient methods. For example, the copolymers useful in this invention can be produced by a process that involves forming a mixture of a siloxane polymer containing a silicon-bonded, halogen-substituted monovalent hydrocarbon group and an alkali metal salt of an oxyalkylene polymer and heating the mixture to a temperature sufficiently elevated to cause the siloxane polymer and the salt to react to produce the copolymer and, as a by-product, an alkali metal halide. As a further example, the copolymers can be produced by a process that involves a platinum-catalyzed addition reaction between a siloxane containing silicon-bonded hydrogen atoms and an oxyalkylene polymer containing alkenyloxy (e.g., vinyloxy) end-blocking groups.

The organic compound capable of forming a polymeric coating employed in the compositions of this invention include the various coating-forming materials employed in conventional paints, varnishes, latices, lacquers, enamels, water-based paints, dopes, shellacs and the like. Illustrative of such compounds are the drying and semi-drying oils (e.g. linseed oil, corn oil, tung oil, perilla oil, fish oil, soybean oil, oiticica oil and dehydrated castor oil), natural varnish and enamel resins (e.g. shellac, rosin, dammar, copal and kauri), synthetic varnish and enamel resins (e.g. oil-soluble phenol aldehyde resins, alkyl resins, phenol-formaldehyde resins and cumar resins), organic rubbers (e.g. butadiene-styrene copolymers, chloroprene polymers, butadiene-acrylonitrile copolymers, isobutylene polymers, isobutylene-isoprene polymers, urethane polymers, chlorinated butadiene polymers, polyisoprene, natural rubbers, and the like), acrylate and methacrylate resins, cellulose derivatives (e.g. nitrocellulose, cellulose acetate, cellulose acetate-butyrate and ethyl cellulose), amino-organosilicon compounds, epoxy monomers and resins, reaction products of epoxy compounds and amino-organosilicon compounds, urea-formaldehyde resins, melamine-formaldehyde resins, silicone resins (e.g. the methylsiloxane and phenylsiloxane resins) organopolysiloxane gums that are convertible to silicone elastomers, and vinyl halide resins. The organic compound capable of forming a polymeric coating employed in the compositions of this invention can be polymeric or can comprise one or more monomeric compounds capable of polymerizing to produce a coating. A single monomer or polymer or mixtures thereof can be employed.

Epoxy compounds which are capable of forming a polymeric coating and which are useful in the compositions of this invention are organic compounds containing at least one pair of vicinal carbon atoms to which oxirane oxygen is attached, i.e.

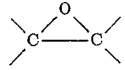

These compounds are for the most part composed of carbon, hydrogen, and oxygen but can also contain such other atoms as nitrogen, sulfur, halogen, phosphorus, silicon, boron, and the like. Typical epoxy compounds are represented by the formula:

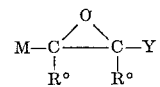

(6)

wherein R° represents alkyl or hydrogen and need not be the same throughout the same molecule; each of the groups M and Y represents hydrogen or a monovalent group composed of a single carbon atom or a group of carbon atoms interconnected by single or multiple bonds and to which such groups as hydrogen, alkyl, hydroxyl, alkoxy, cyclic hydrocarbon groups and the like or combinations thereof can be attached. As groups of carbon atoms, M and Y can contain open chain, e.g., aliphatic or cyclic e.g., cycloaliphatic or aromatic and heterocyclic groups or combinations thereof. M and Y can also contain one or more oxirane oxygen atoms attached to vicinal carbon atoms. M or Y or both can represent alkoxyalkyl groups or groups of carbon atoms interconnected by ether linkages

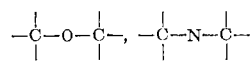

linkages, thio linkages

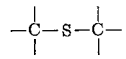

and the like. M and Y, taken together with the vicinal carbon atoms shown can represent a cyclic group such as a cyclohexane ring or a cyclopentane ring, substituted or unsubstituted with other groups, e.g., alkyl, aryl substituents and the like. The presence of other groups not otherwise specifically mentioned herein is by no means harmful and, in fact, are useful in developing special properties in coatings or films formed from those compositions containing such epoxy compounds. For example, M or Y or both can contain one or more olefinic double bonds or acetylenic bonds. Thus, the epoxy compound employed in the treating compositions are selected from the class of monoepoxides and polyepoxides particularly monoepoxides, diepoxides and triepoxides or mixtures thereof. By the term "epoxy," as used herein in designating a group or compound, is meant a group composed of or a compound containing oxirane oxygen attached to vicinal carbon atoms, i.e.

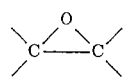

Representative of the coating-forming epoxy compounds defined above are the aliphatic, cycloaliphatic, aliphatic-substituted aromatic and cycloaliphatic substituted aromatic monoepoxides and polyepoxides, such as, butadiene dioxide, the epoxy-octanes, the epoxybutanes, the epoxyhexadecanes, the epoxyoctadecanes, gamma-glycidoxypropyltriethoxysilane, 4,5-epoxypentyltriethoxysilane, cyclohexene monoxide, vinylcyclohexene dioxide, cyclopentene monoxide, dicyclopentadiene dioxide, glycidyl propyl ether, glycidyl allyl ether, diglycidyl ether, 1,2-epoxyethylbenzene, glycidyl phenyl ether, glycidyl butyl ether, 1,2,3-tri(1,2-epoxypropoxy)propane (the triglycidyl ether of glycerine), 3,4-epoxycyclohexylmethyl, 3,4-epoxy-cyclohexanecarboxylate, 1,6-hexanediol bis(3,4-epoxycyclohexanecarboxylate), 1,1,1-trimethylolpropane tris(3,4-epoxycyclohexanecarboxylate) bis(3,4-epoxy-6-methylcyclohexylmethyl) maleate, bis(2,3-epoxycyclopentyl) ether, allyl 2,3-epoxycyclopentyl ether, divinylbenzene dioxide, epichlorhydrin, and the reaction products of halohydrins and polyhydric phenols, i.e., the polyglycidyl polyethers of polyhydric phenols, as for example, the diglycidyl ethers of 4,4'-dihydroxydiphenyl-2,2-propane, 4,4-dihydroxdiphenylmethane and the like and the higher polymers thereof as represented by the formula:

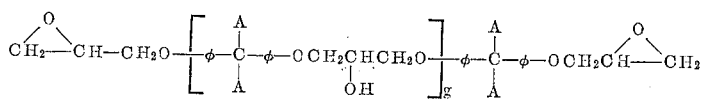

where A is hydrogen or alkyl, φ is phenylene, and g is a number representing the average chain length of the polymer, and is, for example, 0 to 8 or higher. This formula, of course, is ideal and in practice does not in all cases truly represent all the compounds actually obtained by the reaction of epichlorhydrin and polyhydric phenols. Thus, mixtures of the diglycidyl polymers of varying molecular weight and some polymers of higher and lower glycidyl content, e.g., the triglycidyl and monoglycidyl polymers, are obtained in said reaction. The term "diglycidyl ether of a polyhydric phenol," e.g., bisphenol A, hence, includes any such mixtures obtained in practice as well as the pure diglycidyl polymer. The polyglycidyl polyethers are best characterized by their epoxy equivalency, i.e., the grams of polyglycidyl polyether which contains one gram-mole of epoxy group, and their melting points or melting point ranges (such as are determined by Durran's Mercury Method) or their viscosities. The polyhydric phenols, 4,4'-dihydroxydiphenyl-2,2-propane and 4,4'-dihydroxydiphenyl methane are hereinafter referred to as bisphenol A and bisphenol F, respectively.

A large number of such coating-forming epoxy compounds are commercially available. They also can be made by several methods known in the art. One versatile method involves the epoxidation of organic compounds containing olefinic unsaturation employing as epoxidizing agent any one of a variety of peroxides such as peracetic acid, performic acid, perbenzoic acid, acetaldehyde monoperacetate and the like. For example, vinylcyclohexane is epoxidized by peracetic acid to vinylcyclohexane dioxide. Epoxidations of this kind are amply described in the literature and reference is made to United States Patents 2,716,123, 2,745,847, 2,750,395 and 2,785,185 and to Chemical Reviews, volume 45, Number 1, August 1949, pages 1 through 68. Epoxy compounds can be also prepared by the reaction of halohydrins, e.g., epichlorhydrin, with monohydric or polyhydric compounds, e.g., phenols and polyhydric phenols. Such reactions are carried out in accordance with methods well known in the art and generally involve the reaction of halohydrin and hydric compounds in the presence of sufficient caustic alkali, or other strong alkali, to combine with the halogen of the halohydrin. These methods are amply described in the literature, for example, in the United States Patents 2,506,486; 2,582,985; 2,592,560 and 2,615,007.

Organic polyamides can be employed in the compositions of this invention as hardeners or cross-linking agents for the above-described coating-forming epoxy compounds. Such amines include the aliphatic diamines, such as ethylene diamine, propylene diamines, butylene diamines, pentylene diamines, hexylene diamines, octylene diamines, nonylene diamines, decylene diamines, 1,3-diamino-2-propanol, 3,3'-imino-bis-(n-propylamino) and the like; the polyalkylene polyamines, in particular, the polyethylene polyamines and polypropylene polyamines, such as diethylene triamine, triethylene triamine, tetraethylene pentamine, dipropylene triamine, tripropylene tetramine and the like; the hydroxyalkyl alkylene polyamines, such as N-hydroxyethyl pentamethylene diamine, N-hydroxyethyl diethylene triamine, N-hydroxyethyl propylene diamine, N-hydroxyethyl dipropylene triamine, N-hydroxypropyl tetramethylene diamine, N-hydroxypropyl diethylene triamine, N-hydroxypropyl propylene diamine, N,N-dihydroxyethyl diethylene triamine, N,N'-dihydroxyethyl diethylene triamine, N,N-dihydroxyethyl dipropylene triamine, N,N'-dihydroxyethyl dipropylene triamine, tris-hydroxyethyl triethylene tetramine, N,N'-dihydroxypropyl diethylene triamine, N,N-dihydroxypropyl diethylene triamine (method of preparing hydroxyalkyl alkylene polyamines is described in U.S. patent to V. Auerbach et al., 2,901,461); adducts of polyalkylene polyamines prepared by reacting a mixture containing a polyalkylene polyamine, such as the polyalkylene polyamines previously noted, and a polyglycidyl ether of a polyhydric phenol, such as a polglycidyl ether of 2,2-bis-(p-hydroxyphenyl) propane or a polyglycidyl ether of bis-(p-hydroxyphenyl) methane (suitable method of preparing adducts of polyalkylene polyamines is described in the Auerbach et al. supra). The aliphatic organic, polyfunctional amines are used in amounts sufficient to cure the compositions of this invention to hard, tough, infusible products, wherein the amounts range from about 90 percent of stoichiometric to about 10 percent in excess of stoichiometric. For purposes of stoichiometric calculations, one epoxy group

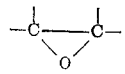

is considered to react with one amino hydrogen.

Amino-organosilicon compounds which are capable of forming a polymeric coating and which are useful in the compositions of this invention include amino-organohydrocarbonoxysilanes and amino-organosiloxanes having a primary or a secondary amino group that is bonded to a silicon atom through at least three successive carbon atoms of divalent hydrocarbon group.

The coating-forming amino-organo(hydrocarbonoxy)-silanes that are useful in the coating compositions of the present invention are represented by the formula:

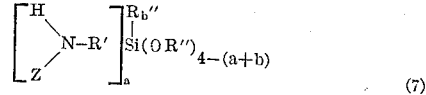

(7)

wherein Z is a hydrogen atom or a monovalent hydrocarbon group having from 0 to 1 amino groups, from 0 to 1 hydroxy groups and from 0 to 1 hydrocarbonoxy groups as substituents, R' is a divalent hydrocarbon group, R'' is a monovalent hydrocarbon group, the

group is attached to the silicon atom through at least three successive carbon atoms of the group represented by R', a has a value from 1 to 3 inclusive, b has a value from 0 to 2 inclusive and (a+b) has a value from 1 to 3 inclusive.

The coating-forming amino-organosiloxanes that are useful in the coating compositions of the present invention include those siloxanes that are composed essentially of groups having the formula:

$$\left[ \begin{array}{c} H \\ \diagdown \\ Z \end{array} N-R' \right]_a \begin{array}{c} R_b'' \\ | \\ SiO_{\frac{4-(a+b)}{2}} \end{array} \qquad (8)$$

wherein Z, R', R'', a, b, (a+b) and the position of the $$\begin{array}{c} H \\ \diagdown \\ Z \end{array} N-$$

group are as defined above for Formula 7.

The coating-forming amino-organosiloxanes that are useful in the compositions of the present invention also include those siloxanes that are composed essentially of from 0.1 to 99.9 mole percent of groups represented by Formula 8 and from 0.1 to 99.9 mole percent of groups represented by the formula:

$$R'''SiO_{\frac{4-c}{2}} \qquad (9)$$

wherein R''' is a monovalent hydrocarbon group and c has a value from 0 to 3 inclusive. Preferably these latter siloxanes are composed of from 25 to 99.9 mole percent of groups represented by Formula 8 and from 0.1 to 75 mole percent of groups represented by Formula 9.

Illustrative of the monovalent hydrocarbon groups represented by Z and R'' in Formulae 7 and 8 and R''' in Formula 9 are the monovalent hydrocarbon groups mentioned above as illustrating R in Formula 1.

Illustrative of the amino-substituted monovalent hydrocarbon groups represented by Z in Formula 7 are the aminoalkyl groups (such as the gamma-aminopropyl, delta - aminobutyl, gamma - aminoisobutyl and epsilon-aminopentyl groups), and the N-hydrocarbon-aminoalkyl groups (such as the N-methyl-gamma-aminopropyl group and the N,N-diphenyl-delta-aminobutyl group). Illustrative of the hydroxy-substituted monovalent hydrocarbon groups represented by Z in Formula 7 are the hydroxyalkyl groups (such as the beta-hydroxyethyl and the beta-hydroxypropyl groups). Compounds having such hydroxy substituted groups can be produced by reacting a primary amino-organosilicon compound and an epoxide (no more than one epoxy group reacted per primary amino group). Illustrative of the alkoxy-substituted monovalent hydrocarbon groups represented by Z in Formula 7 are the gamma-methoxypropyl and the gamma-ethoxypropyl groups.

Illustrative of the divalent hydrocarbon groups represented by R' in Formula 7 are the linear alkylene groups (for example, the trimethylene, —(CH$_2$)$_3$—, and the octadecamethylene, —(CH$_2$)$_{18}$— groups), the arylene groups (for example, the naphthylene, —C$_{10}$H$_6$— and para-phenylene, —C$_6$H$_4$— groups); the cyclic alkylene groups (for example, the cyclohexylene, —C$_6$H$_{10}$— group); the alkarylene groups (for example the tolylene, CH$_3$C$_6$H$_3$= group) and the aralkylene groups (for example the —CH$_2$(C$_6$H$_3$)CHCH$_2$CH$_2$— group).

The phrases "monovalent hydrocarbon group" and "divalent hydrocarbon group" are employed herein in the generic sense to denote both unsubstituted and substituted (e.g. NH$_2$, OH and OR'' substituted) groups.

Illustrative of the amino-organo(hydrocarbonoxy)silanes represented by Formula 7 are gamma-aminopropyltriethoxysilane, gamma - aminopropyl(methyl)diethoxysilane, gamma-aminopropyldimethyl(ethoxy)silane, delta-aminobutyltriethoxysilane, delta - aminobutyl(methyl)diethoxysilane, delta-aminobutyldimethyl(ethoxy)silane, N-methyl-gamma-aminoisobutyltriethoxysilane, epsilon-aminopentyltriethoxysilane, ortho - aminophenylmethyltripropoxysilane, para - aminophenyldiphenyl(phenoxy)silane, N - beta - aminoethyl-gamma-aminopropyltriethoxysilane (i.e. H$_2$NCH$_2$CH$_2$NH(CH$_2$)$_3$—Si(OC$_2$H$_5$)$_3$, and N-gamma-aminopropyl-gamma-aminopropyltriethoxysilane (i.e. H$_2$N(CH$_2$)$_3$NH(CH$_2$)$_3$Si(OC$_2$H$_5$)$_3$.

Illustrative of the groups represented by Formula 8 are the gamma-aminopropylsiloxy, gamma-aminopropyl(methyl)siloxy (i.e. H$_2$N(CH$_2$)$_3$Si(CH$_3$)O), gamma-aminopropyldimethylsiloxy, delta-aminobutyldimethylsiloxy, delta-aminobutyl(methyl)siloxy, delta-aminobutyldimethylsiloxy, N-methyl - gamma - aminoisobutylsiloxy, epsilon-aminopentylsiloxy, para-amino - phenylmethylsiloxy (i.e. H$_2$NC$_6$H$_4$CH$_2$SiO$_{1.5}$), para - aminophenyldiphenylsiloxy, N-beta-aminoethyl - gamma - aminopropylsiloxy (i.e. H$_2$NCH$_2$CH$_2$NH(CH$_2$)$_3$SiO$_{1.5}$) and N-gamma-aminopropyl-gamma-aminopropylsiloxy (i.e.

$$H_2N(CH_2)_3-NH(CH_2)_3SiO_{1.5})$$

groups.

Illustrative of the groups represented by Formula 9 are the SiO$_2$, methylsiloxy, dimethylsiloxy, trimethylsiloxy, vinylsiloxy, amylsiloxy, diphenylsiloxy, methyldiphenylsiloxy, vinyl(ethyl)siloxy (i.e.

$$CH_2=CHSi(C_2H_5)O)$$

and beta-phenylethyl(methyl)siloxy (i.e.

$$C_6H_5CH_2CH_2Si(CH_3)O)$$

groups.

The silicon atom in each group represented by Formulae 8 and 9 in the above-described amino-organosiloxanes is bonded through at least one oxygen atom to at least one other silicon atom. In addition to the substituents indicated in these formulae, some or all of the silicon atoms in the groups represented by Formulae 8 and 9 can be bonded by any remaining valences to hydrogen atoms through oxygen (in which case the inhibitor contains the Si-OH group) and some or all of the silicon atoms in the groups represented by the Formulae 8 and 9 can be bonded by any remaining valences to monovalent hydrocarbon groups through oxygen (in which case the inhibitors contain the Si-OR'' group). These siloxanes can also contain silicon-bonded hydrogen atoms (i.e. SiH).

The above-described amino-organosiloxanes preferably have an organic group to silicon atom ratio from 0.5:1 to 2.8:1 and even more desirably have an organic group to silicon atom ratio from 0.9:1 to 2.5:1. These siloxanes can be linear, cyclic or cross-linked in structure and they contain a total of at least 2 and up to from 100 to 1000 or more siloxane groups.

A silane having the formula:

$$R_c'''Si(OR'')_{4-c} \qquad (10)$$

wherein R''', R'' and c have the above-defined meanings can be present in the coating compositions of this invention along with silanes represented by Formula 7. Illustrative of the silane represented by Formula 10 are methyltriethoxysilane, dimethyldiethoxysilane, trimethylethoxysilane, vinyltriethoxysilane, benzyltripropoxysilane, phenyl(methyl)diproxysilane, phenyltriethoxysilane and diphenyldiethoxysilane.

The coating-forming amino-organo(hydrocarbonoxy)-silanes that are preferred for use in the coating compositions of the present invention are those silanes within the scope of Formula 7 which are more specifically depicted by the formula:

$$\begin{array}{c} H \\ \diagdown \\ Z \end{array} NC_dH_{2d}Si(OR'')_{3-b} \begin{array}{c} R_b'' \\ | \\ \end{array} \qquad (11)$$

wherein d has a value of at least 3 and preferably has a value from 3 to 5 inclusive, C$_d$H$_{2d}$ is an alklylene group, the $$\begin{array}{c} H \\ \diagdown \\ Z \end{array} N-$$

group is bonded to the silicon atom through at least three carbon atoms of the $C_dH_{2d}$ group, $Z'$ is hydrogen or an aminoalkyl group (e.g., a beta-aminoethyl, gamma-aminopropyl or delta-aminobutyl group), and $R''$ and $b$ have the meanings defined for Formula 7.

The coating-forming amino-organosiloxanes that are preferred for use in the coating compositions of present invention are those siloxanes containing those groups within the scope of Formula 8 which are more specifically depicted by the formula:

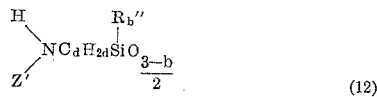     (12)

wherein $d$, $C_dH_{2d}$, $Z'$, the position of the

group, $R''$ and $b$ are as defined above for Formula 11.

The above-described amino-organosilicon compound can generally be produced by known processes (e.g. by reducing the corresponding cyano-organosilicon compounds or by reacting the corresponding halo-organosilicon compounds with ammonia or primary amines).

Silanes represented by Formula 7 where Z is an amino-substituted monovalent hydrocarbon group can be produced by reacting a diamine and a halo-organo(hydrocarbonoxy)silane under anhydrous conditions with three moles of the diamine being present per mole of the silane at a temperature from 50° C. to 300° C. [e.g. ethylene diamine can be reacted with gamma-chloropropyltriethoxysilane under the indicated conditions to produce $H_2NCH_2CH_2NH(CH_2)_3Si(OC_2H_5)_3$].

The above-described epoxy compounds and amino-organosilicon compounds can be used separately as the coating-forming component in the compositions of this invention. However remarkably good coating-forming components are produced by mixing or reacting these epoxy compounds and amino-organosilicon compounds. Such mixtures or reaction products are extremely useful as the coating-forming components in the compositions of this invention. The relative proportions of amino-organosilicon compounds and epoxy compound contained in these coating compositions are not narrowly critical and can be varied over a wide range. Amounts of epoxy compound providing from 0.05 to 5.0 epoxy equivalents for each amino hydrogen equivalent provided by the amino-organosilicon compound contained by the composition are useful. Compositions containing such amounts of the reactive components provided corrosion resistance to metals coated therewith. By the term "epoxy equivalents," as used herein, is meant the number of moles of epoxy groups

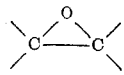

contained by a given amount of epoxy compound. Thus, one mole of monoepoxide contains one epoxy equivalent, one mole of a diepoxide contains two epoxy equivalents, and so forth. The term "epoxy equivalency," as used herein, means the number of grams of an epoxy compound which contains one gram-mole of epoxy group and is the reciprocal of the epoxy equivalents. The term "amino hydrogen equivalents," as used herein, means the number of moles of amino hydrogen atoms, H-, attached to nitrogen, contained by a given amount of amino-organosilicon compound. Thus, one mole of gamma-aminopropyltriethoxysilane contains two amino-hydrogen equivalents, one mole of gamma-aminopropylphenyl cyclic tetramer contains eight amino hydrogen equivalents and so forth. Ripened (i.e., partially cured) and the finally cured products of amino-organosilicon compounds and epoxides are higher in molecular weight than any of the reactants contained by the composition from which they are formed. Thus, one function of the epoxy compound is, in effect, to cross-link the amino-organosilicon compounds thereby increasing the molecular weight. The fundamental reaction occurring during ripening and final curing takes place between the amino-organosilicon compound and the epoxy compound and involves the addition of the amino group to the epoxy group to form a nitrogen to carbon bond linking the amino-silicon compound molecule to the epoxy compound molecule and also a hydroxyl group attached to said epoxy compound molecule. Using the reaction between a gamma-aminopropylsilicon compound and styrene oxide as exemplary, the fundamental reaction is illustrated by:

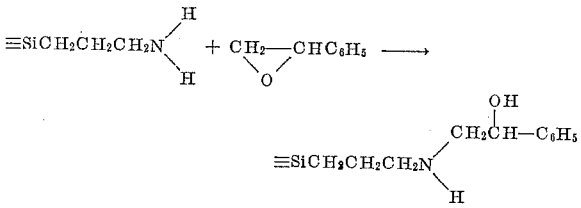

where the amounts of reactants correspond to one epoxy equivalent for two amino hydrogen equivalents.

The vinyl halide polymers which are capable of forming a polymeric coating and which are useful in the coating compositions of the present invention include homopolymeric vinyl halide polymers (e.g. homopolymeric vinyl chloride polymers and homopolymeric vinyl fluoride polymers) and copolymeric vinyl halide polymers (e.g. copolymeric vinyl chloride polymers and copolymeric vinyl fluoride polymers). Suitable copolymeric vinyl halide polymers are preferably composed of at least 60 parts by weight of copolymerized vinyl halide per 100 parts by weight of the polymer and up to 40 parts by weight of another copolymerized olefinically unsaturated compound per 100 parts by weight of the polymer. More desirably, the copolymeric vinyl halide polymers are composed of at least 85 parts by weight of copolymerized vinyl halide per 100 parts by weight of the polymer and up to 15 parts by weight of another copolymerized olefinically unsaturated compound per 100 parts by weight of the polymer. The compounds that can be copolymerized with vinyl halides to produce suitable copolymeric vinyl halide polymers include vinylidene halides (e.g. vinylidene chloride and vinylidene bromide), alkenyl esters of alkanoic acids (e.g. vinyl acetate), alkenyl benzoates (e.g. vinyl benzoate), alkyl acrylates (e.g. methyl acrylate, ethyl acrylate, butyl acrylate and octyl acrylate), alkyl methacrylates (e.g. methyl methacrylate, ethyl methacrylate, butyl methacrylate and octyl methacrylate), dialkyl esters of olefinically unsaturated dicarboxylic acids (e.g. dimethyl maleate and diethyl fumarate), alkenyl cyanides (e.g. acrylonitrile), tetrahaloethylenes (e.g. chlorotrifluoroethylene), amides of olefinically unsaturated aliphatic carboxylic acids (e.g., acryl amide and N,N-dimethyl methacrylamide), aralkenes (e.g. styrene and vinyl naphthylene), alkenyl alkyl ethers (e.g. vinyl methyl ether), alkenyl alkyl ketones (e.g. vinyl methyl ketone), alkanes (e.g., ethylene) and alkenyl substituted heterocyclic compounds (e.g. vinyl pyridine). A single vinyl halide polymer or a mixture of vinyl halide polymers can be used in the compositions of the present invention.

Vinyl halide polymers that are suitable for use in the present invention are capable of forming films when applied to metal surfaces in the form of a lacquer, paste or dope and then cured. Such films can be self-supporting but they need not necessarily have that property. Hence these vinyl halide polymers can be described as "film forming." Suitable vinyl halide polymers preferably have specific viscosities (measured using a solution of one gram of the polymer dissolved in 100 milliliters of nitrobenzene or methyl isobutyl ketone), from 0.15 to 0.30 and, even more desirably, can have specific viscosities from 0.18 to 0.26 (measured as described). The preferred vinyl halide polymers are homopolymeric vinyl chloride polymers and copolymeric vinyl chloride polymers. The latter polymers preferably contain vinyl chloride copolymerized with vinyl acetate and vinylidene chloride.

Vinyl halide polymers that are suitable for use in those compositions of the present invention that are organosols or plastisols are preferably in a particulate form. Particulate vinyl halide polymers having an average particle size from 0.5 to 100 microns are preferred but it is even more desirable that the particulate vinyl halide polymer has a particle size from 0.5 to 20 microns.

Alkyd resins which are capable of forming a polymeric coating and which are useful in the present invention include the various reaction products of polyhydric alcohols (e.g. glycerol, ethylene glycol, dipentaerythritol, trimethylol ethane, trimethylol propane, and sorbitol) and polybasic carboxylic acids (e.g. phthalic, maleic and sebacic acids) or the anhydrides thereof. Such alkyd resins can be modified with saturated or olefinically unsaturated monocarboxylic acids (e.g. fatty acids such as linseed, castor, tung or fish oil). Included among alkyd resins are those produced from olefinically unsaturated polybasic acids and polyhydric alcohols, which resins have been modified by reaction with vinylic compounds (e.g. styrene, alpha-methyl styrene or vinyl toluene).

Olefin polymers which are capable of forming a polymeric coating and which are useful in the compositions of this invention include the normally solid polymers of the lower hydrocarbon olefins, i.e., those olefins containing up to about 6 carbon atoms. Illustrative of these polymers are the normally solid crystalline homopolymers of ethylene and propylene, the normally solid crystalline thylene-propylene copolymers, and the normally solid crystalline copolymers and interpolymers of lower olefins containing polymerized therein, in addition to ethylene or propylene, a minor amount of a monomeric vinyl compound containing the characteristic vinyl radical,

Particularly useful in such interpolymers are those vinyl compounds having the general formula:

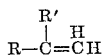

wherein R is selected from the group consisting of halogen, aryl, cyano, alkyl and carboxylate radicals, and R' is either hydrogen, halogen or an alkyl group containing from 1 to 6 carbon atoms. Illustrative of these vinyl monomers, but in no way limitative thereof, are vinyl chloride, vinylidene chloride, vinyl bromide, styrene, alpha-methyl styrene, acrylonitrile, alkyl acrylates (such as methyl acrylate and ethyl acrylate), and alkyl methacrylates (such as methyl methacrylate), vinyl esters (such as vinyl acetate), as well as acrylic and methacrylic acid, and the like as well as terpolymers of such monomers. Such olefin polymers preferably have melt indices (as measured by ASTM-D-1238-62T) from 0.01 to 100 decigrams per minute and preferably from 0.05 to 10 decigrams per minute. Preferably, the densities of such olefin polymers are from 0.83 to 0.98. Suitable olefin polymers can be produced by either high pressure or low pressure processes.

Organopolysiloxane gums convertible to silicone elastomers which are capable of forming a polymeric coating and which are useful in the compositions of this invention consists essentially of siloxane groups represented by the formula:

(13)

wherein R is a monovalent hydrocarbon group that is free of olefinic unsaturation and that can contain a cyano or halogen substituent and R' is R or a monovalent olefinically unsaturated hydrocarbon group. The ratio of the organic groups (i.e. R and R' groups) to silicon atoms in the organopolysiloxane gum is from 1.95 to 2.05. Illustrative of the monovalent olefinically unsaturated hydrocarbon groups that are represented by R' in Formula 13 are the alkenyl groups (for example, the vinyl and the allyl group) and the cycloalkenyl groups (for example, the cyclohexenyl group). The preferred monovalent olefinically unsaturated hydrocarbon group is the vinyl group. Illustrative of the monovalent hydrocarbon groups that are free of olefinic unsaturation and that are represented by R and R' in Formula 13 are the alkyl groups (for example, the methyl, ethyl and propyl groups); the aryl groups (for example, the phenyl group); the aralkyl groups (for example, the benzyl and the phenylethyl group); and the cycloalkyl groups (for example, the cyclohexyl group). R and R' can also represent cyano-substituted monovalent hydrocarbon groups such as the beta-cyanoethyl, gamma-cyanopropyl and cyanophenyl groups or halogen-substituted monovalent hydrocarbon groups such as the gamma-chloropropyl and gamma-fluoropropyl groups.

Useful organopolysiloxane gums may contain siloxane groups that are represented by Formula 13 wherein either the same hydrocarbon groups are attached to the silicon atoms (e.g. the dimethylsiloxy, diphenylsiloxy and diethylsiloxy groups) or different hydrocarbon groups are attached to the silicon atoms (e.g. the methylphenylsiloxy, phenylethylmethylsiloxy, ethylphenylsiloxy, methylvinylsiloxy and phenylvinylsiloxy groups). Useful organopolysiloxane gums contain one or more types of siloxane groups represented by Formula 13. By way of illustration, one useful gum is composed of only dimethylsiloxy groups; a second useful gum is composed of methylvinylsiloxy groups and dimethylsiloxy groups; and a third useful gum is composed of methylvinylsiloxy groups, dimethylsiloxy groups and diphenylsiloxy groups.

The curing of the organopolysiloxane gum involves the production of crosslinks between the molecules of the gum. Silicon-bonded monovalent olefinically unsaturated hydrocarbon groups [i.e. groups represented by R' in Formula 13] react to produce such crosslinks between the molecules of the organopolysiloxane gum. The relative amount of the siloxane groups represented by Formula 13 wherein R' is a monovalent olefinically unsaturated hydrocarbon group contained in the gum is that amount which provides the degree of crosslinking necessary to impart elastomeric properties to the cured product. The cured products produced from gums that are crosslinked by an insufficient amount of groups represented by Formula 13 wherein R' is a monovalent olefinically unsaturated hydrocarbon group are soft and gummy rather than elastomeric. The cured products produced from gums that are crosslinked by an excessive amount of groups represented by Formula 13 wherein R' is a monovalent olefinically unsaturated hydrocarbon group are hard and brittle rather than elastomeric. Generally, amounts of such siloxane groups from 0.05 part to 3.0 parts by weight per 100 parts by weight of the siloxane groups in the gum usually provide the degree of crosslinking necessary to produce an elastomeric product. Preferably, the gum contains from 0.2 part to 0.4 part by weight of such siloxane groups per 100 parts by weight of the siloxane groups in the gum. Conversely, in this instance, the gum may contain from 97.0 parts to 99.95 parts by weight but preferably contains from 99.6 parts to 99.8 parts by weight of siloxane groups represented by Formula 13 wherein R' is a monovalent hydrocarbon group that is free of olefinic unsaturation. The presence of silicon-bonded monovalent olefinically unsaturated hydrocarbon groups in the gum is not essential since other silicon-bonded groups (e.g. silicon-bonded alkyl groups)

can react to produce crosslinks between the molecules of the gum.

Such organopolysiloxane gums are generally mixed with fillers prior to curing to form elastomers. Such fillers include acidic fillers (such as uncoated finely divided silica), basic fillers (such as carbon black and alumina) and neutral fillers (such as diatomaceous earth, coated finely divided silica, calcium carbonate and quartz). These fillers impart desirable physical properties (e.g. high tensile strength) to silicone elastomers. The amount of the filler is not narrowly critical and may range from 25 parts to 65 parts by weight of the filler per 100 parts by weight of the organopolysiloxane gum. Preferably from 35 parts to 45 parts by weight of the filler per 100 parts by weight of the gum are employed.

The above-described organopolysiloxane gums are generally cured employing organic peroxides as curing agents. Included among such organic peroxides are alkyl peroxides, acyl peroxides and alkyl-acyl peroxides. Useful alkyl peroxide curing agents are the dialkyl peroxides (such as di(tert-butyl) peroxide and dicumyl peroxide) and the alkyl hydroperoxides (such as tert-butyl hydroperoxide and cumene hydroperoxide). Useful acyl peroxide curing agents are the diacyl peroxides (such as benzoyl peroxide, p-chlorobenzoyl peroxide and 2,4-dichlorobenzoyl peroxide) and per acids or peroxy acids (such as peracetic acid and perbenzoic acid). Useful alkylacyl peroxide curing agents may be illustrated by such compounds as tert-butyl perbenzoate and tert-butyl peracetate. The amount of the organic peroxide used as a curing agent is not narrowly critical. In practice the amount of the curing agent may vary from 0.1 part by weight to 4 parts by weight of the peroxide per 100 parts by weight of the organopolysiloxane gum.

In addition to the filler and curing agent, various other additives (e.g. silanes, silicone oils, pigments, etc.) can be mixed with the organopolysiloxane gum prior to conversion to an elastomer.

Such organopolysiloxane gums are usually cured with peroxides by the application of heat to produce a cured silicone elastomer. The gum may be heated by various known means, such as on a slab mold. The gum may be cured by heating to a temperature of from 110° C. to 200° C. The preferred curing temperature, when organopolysiloxane gums that cure through olefinically unsaturated hydrocarbon groups are used, is from 170° C. to 180° C. The preferred cure temperature for other gums is usually from 120° C. to 130° C. The gum may be maintained at the curing temperature for from 5 minutes to 30 minutes but preferably for from 15 minutes to 20 minutes. Heating the gum to other temperature for other periods of time may accomplish the cure of the gum compound, since the particular temperature and time used is not narrowly critical, but no particular advantage is gained by departing from the indicated temperature and time ranges. Of course, gums can be cured at room temperature upon the addition of certain additives as is well known in the art.

Liquid organic diluents which are employed in the compositions of this invention include any volatile liquid organic compound which is free of groups which substantially react with other components in the compositions at atmospheric temperatures and pressures. These diluents include volatile liquids such as hydrocarbons, chlorinated hydrocarbons, nitrogenated paraffins, ethers and alcohols. Liquid diluents which are solvents for the block copolymer and the coating-forming component are the easiest to use and hence are preferred. These liquid solvents when mixed with the other components provide liquid solutions which are simple to prepare and can be readily varied in concentration so as to allow the versatile use of the treating composition. However diluents which form suspensions or emulsions with the other components of the compositions are also useful. A single diluent or mixture of diluents can be used.

Liquid organic diluents used in the compositions of this invention include the saturated and unsaturated hydrocarbons, e.g., heptane, cyclohexane, heptene, mineral spirits (i.e., volatile hydrocarbons derived low boiling petroleum fractions), toluene, xylene, tetrahydronaphthalene, decahydronaphthalene and the like; the halogenated hydrocarbons, e.g., chlorobenzene, chloroform, carbontetrachloride, trichloroethylene, dichloroethyl ether and the like; nitrated paraffins, e.g., nitropropane; hydrocarbon ethers, e.g., isopropyl ether, diphenyl ether, dioxane, and the like; hydrocarbon alcohols and alcoholethers, e.g., ethanol, butanol, ethylene glycol, diethylene glycol, and the monoalkyl ethers of ethylene, diethylene propylene and dipropylene glycol, monomethyl ether of ethylene glycol thereof, and the like.

Additives or modifying solvents can be incorporated into the coating compositions of this invention for modifying the properties of the compositions themselves or the films made therefrom. Such additives include ketones, aldehydes, esters, acids, pigments, other coloring agents, fillers, plasticizers, and resins (including silicone and organic resins). Typical additives are methyl isobutyl ketone, isophorone, heptaldehyde, amyl acetate, ethyl acetate. The additives can be reactive or non-reactive with the coating compositions. These additives, when added to the treating compositions, aid in modifying or enhancing film properties in effecting economies by adding bulk to the films, if such is desired. Illustratively, the ketones, esters and aldehydes which are lacquer-type solvents are added to enhance anti-blush and anti-craze properties, act as leveling agents and in general aid the film-forming properties of the coating compositions. In addition, driers such as cobalt, naphthenate and lead resinate can be incorporated in the compositions. Moreover pigments such as titanium dioxide, zirconium oxide, zinc sulfide, antimony oxide, talc and silica can be added. Silicone resins enhance anti-wetting properties and hardness and promote faster drying of films laid down from compositions containing them. Many other additives for developing special properties and enhancing other properties of films are known to those skilled in the art of protective coatings and in accordance with the knowledge of those skilled in the art can be employed for similar purposes in the compositions of this invention.

The coating compositions of this invention can be formed in any convenient manner. Thus the coating-forming compound, diluent and any additives can be admixed in the sequence and in the apparatus used in producing conventional coating compositions. The siloxane-polyoxyalkylene block copolymer can then be mixed in any convenient manner with the admixture so formed to produce the coating composition of this invention.

A convenient manner for forming those compositions of this invention which contain polymeric coating-forming components that are produced by polymerizing monomers in a diluent is to form a mixture of the block copolymer and the diluent prior to producing the polymeric coating-forming component in the diluent. Thus a block copolymer can be mixed with a diluent (e.g., water), a monomer can be introduced into the diluent (e.g., vinyl chloride or butadiene) and the monomer (either emulsified in the diluent or suspended in the diluent) can be polymerized to produce a composition of this invention (e.g., a latex composed of water, a block copolymer and a vinyl chloride homopolymer or a butadiene polymer). In this method of producing the compositions of this invention, the block copolymers can function as emulsifying agents for the diluent-monomer emulsion or as suspension stabilizers to prevent excessive agglomeration of the polymer. Conventional additives (e.g., gelatin) can be added in such polymerization reactions.

The coating compositions of this invention can be applied to surfaces and cured thereon to produce remarkably adherent protective coatings thereon. Applications can be made by spraying from aerosol bombs and from spray guns. In this instance, the usual chloroperfluorohydrocarbons, such as monochloroperfluoromethane, dichloroperfluoromethane, monochloroperfluoromethane, mixtures thereof and the like, and the volatile hydrocarbon gases, such as propane, the butanes, the pentanes, butene, amylenes, mixtures thereof and the like are used as propellants for the coating compositions. The propellant and the coating composition, as a solution, emulsion or in undiluted form, are enclosed in a suitable aerosol container or bomb. Any other suitable manner of application of the composition to the surface and any suitable manner of curing the composition can be employed. Thus the composition can be applied by brushing, dipping, knife coating, spraying, roller coating, or flooding and the compositions so applied can be cured (i.e., converted to solid, dry, non-tacky, continuous films or coatings) by exposure to atmospheric conditions or by heating to elevated temperatures. The latter method of curing is often preferred. The cure temperature is that conventionally used to cure the coating-forming component of the composition. Curing temperatures from 100° C. to 300° C. are usually preferred. Conventional cure catalysts can be employed, if desired. Curing involves fusion in the case of organosols and plastisols, volatilization of any volatile organic solvent and volatilization of any diluents and may also involve chemical reaction (e.g., polymerization).

The suitability of any given coating composition of this invention for producing a satisfactory coating on any particular surface is governed by the type of coating-forming component in the composition. In this respect, the best area of utility for any given composition of this invention is the same as that of a conventional coating composition containing the same coating-forming component. Thus compositions of this invention wherein the coating-forming components are epoxides are, like conventional coating compositions wherein the coating-forming components are similarly epoxides, well suited for forming protective coatings on metal surfaces.

Surfaces that are amenable to being coated with the coating compositions of this invention include metal, ceramic, cementitious, and wood surfaces.

Metal surfaces on which remarkably adherent coatings can be produced from the coating compositions of this invention include the metals below sodium in the electromotive series (e.g., aluminum, magnesium, iron, copper, chromium, nickel, lead, tin and zinc) as well as alloys of such metals (e.g. tin solder, brass, bronze and steel). Such metal surfaces need not be pretreated but, if desired the surfaces can be pre-treated by conventional means (e.g., treated with phosphates to prevent corrosion). Such metals are solids at 25° C. and normally become corroded when in prolonged contact with heated aqueous saline solutions or hot humid air. The compositions are particularly applicable to coating surfaces of iron, brass and/or copper and the alloys of these metals.

Base members having ceramic surfaces can be coated with coating compositions of this invention. These surfaces include articles having surfaces formed by the firing or baking of earth containing clays or clay mixtures as is commonly known in the art. These articles or surfaces include ceramic substances made by firing or baking such earth as pure and impure kaolins, kaolin mixtures with feldspars, quartz, sand, mica, iron oxides, oxides of titanium, magnesium, calcium, potassium, sodium and the like, silicates, carbonates, aluminates and the like. Such articles or surfaces include glazed or unglazed porcelains, chinas, pottery, earthenware, porcelain enamels, bricks, tiles and the like.

Base members having cementitious surfaces can be coated with coating compositions of this invention. These members include articles having surfaces comprising a non-vitreous inorganic cement in a hardened condition. These articles or surfaces include crystalline calcium hydroxide, calcium carbonate, calcium sulfate monohydrate, $(CaSO_4)_2H_2O$, and the like, alone or as binders for the various fillers and other materials for providing special effects employed in the art, as for example, sand, asbestos, diatomaceous earths, kieselguhr, mica, wood flour, cotton flock, paper pulp, marble chips, silicates, carbonates, aluminates and metal oxides. Illustrative of such articles or surfaces are marble, limestone, sandstone, mortar, concrete, plaster of Paris, sea shells, terrazzo, asbestos shingles and the like.

Base members having wood surfaces can be coated with compositions of this invention. Such woolen surfaces include pine, fruit wood, oak, plywood, spruce and the like.

The thickness of the coating produced on as surface with a coating composition of this invention is not narrowly critical. The desirable coating thickness is governed by the particular coating-forming component and the particular surface being coated in accordance with conventional coating practice.

The relative amounts of the coating-forming compound, siloxane-oxyalkylene block copolymer and liquid organic diluent present in the coating compositions of this invention are not narrowly critical and depend on various factors such as the chemical and physical properties of these components, the desired coating thickness to be produced, the number of times the composition is to be applied to produce a coating, and the like. In general, the useful and preferred amounts of these components are as follows:

|  | Parts By Weight | |
| --- | --- | --- |
|  | Useful | Preferred |
| Coating-Forming Compound | 1 to 50 | 2 to 10. |
| Block Copolymer | 0.001 to 30 | 0.1 to 5. |
| Diluent | 20 to 98.999 | 85 to 97.9. |

As is apparent to one skilled in the art, the materials referred to hereinabove as "organic compounds capable of forming a polymeric coating" and "coating-forming compounds" are also useful in a wide variety of applications other than coating applications. By way of illustration, such materials are useful in producing molded, cast and extruded products and the like. As is also apparent, the block copolymers described above impart properties to such "coating-forming compounds" which will improve the performance of such organic compounds in these other applications (e.g. the copolymers improve the compatibility of a molding resin with the other components of the molding composition, facilitate release from molds, etc.). In addition, the copolymers improve such properties of molded, cast and extruded "coating-forming compounds" as antistatic properties and lubricity. Accordingly, it is often convenient to provide mixtures of a major amount of the above-described coating forming compounds and a minor amount of the above-described block copolymers and to employ such mixtures in thermoforming, i.e., in producing molded, cast and extruded articles and the like. As is apparent to those skilled in the art of molding, extruding, casting and the like, such mixtures can contain various conventional additives (including many of the diluents and other additives described above for use in coating compositions), to impart special properties to the articles to be produced. In such mixtures, the relative amount of the coating-forming compound and the block copolymer is not narrowly critical. Thus, from 0.001 to 30 parts by weight of the copolymer per 100 parts by weight of the coating-forming compound are generally useful. Preferably, from 0.1 to 5 parts by weight of the copolymer per 100 parts by weight of the coating-forming compound are employed. Preferred "coating-forming compounds" in such mixtures are polyethylene and vinyl-halide polymers.

The block copolymers can be incorporated in "coating-forming compounds" in accordance with the practice of this invention by any suitable means such as by blending, milling and the like. Thereafter, the desired coating, molded object, extruded object, etc. can be produced from the coating-forming compound containing the block copolymer by conventional methods. Alternately, the coating-forming compound can be first converted to the desired shape (e.g. coating, molded object, etc.) and thereafter the block copolymer can be applied to the outer surface of the product. Suitable means of application include immersing the product in a solution or dispersion of the block copolymer or spraying or painting a solution or dispersion of the block copolymer on the surface of the product. Solvents or diluents suitable for so applying the block copolymers are acetone, benzene, toluene, ethanol, water and the like.

The following examples illustrate the present invention:

*Example I*

A solution was prepared containing 90 parts by weight of toluene and 10 parts by weight of a block copolymer having the formula:

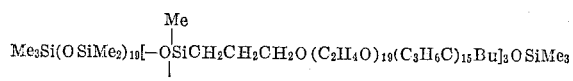

One milliliter of the copolymer-toluene solution was mixed with 100 milliliters of a commercially available acrylic paint ("Acryloid B-82") composed of 40 parts by weight of an acrylate ester polymer and 60 parts by weight of toluene. The acrylic paint had a specific gravity of 0.97 and a viscosity of about 560 centipoises at 30° C. The mixture was allowed to stand for 15 hours to permit the escape of bubbles. Then the mixture was flow-coated on a steel panel which had been previously cleaned with trichloroethylene. The coated panel was allowed to dry in air. The coating procedure was repeated with another portion of the acrylic paint to which no block-copolymer had been added. Compared to the latter paint, the block copolymer-containing paint exhibited improved flow out, leveling and wetting.

The experiment described in the last paragraph was repeated employing one fifth the amount of the copolymer-toluene solution. Once again improved flow out, leveling and wetting were achieved.

*Example II*

A pigment paste was produced by mixing 15.7 grams of ethylene glycol as a solvent, 172.5 grams of a vinyl acetate homopolymer, 8.8 grams of dibutyl phthalate as a plasticizer, 11.8 grams of diethylene glycol dimethyl ether as a solvent ("Ansul Ether 141"), 11.8 grams of C$_4$H$_9$OCH$_2$CH$_2$OCH$_2$CH$_2$OOCCH$_3$ (butyl carbitol acetate) as a solvent and 47.5 grams of a 5 weight-percent solution of hydroxyethyl cellulose in water as a thickener ("Cellosize WP-4400"). Calcium carbonate (300 grams), titanium dioxide (100 grams) and water (370 grams) were mixed in a ball mill and, during the mixing, the pigment paste was added. The mixture was milled for 24 hours to produce a latex paint. To the paint was added a block copolymer having the formula:

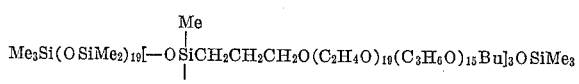

One thousand parts by weight of the block copolymer per million parts by weight of the paint were added. A steel panel was brush-coated with the paint and the panel was air-dried. The paint readily wetted the panel and the coating was free of fisheyes. An otherwise identical paint free of the block copolymer wetted the panel poorly and produced a panel that was marred by fisheyes.

Better wetting and freedom from fisheyes were also obtained with the above-described latex paint when a block copolymer was employed having the formula:

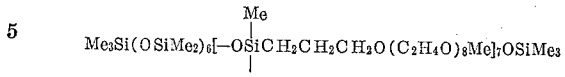

*Example III*

A coating composition of this invention is produced by mixing 100 parts by weight of the diglycidyl ether of 2,2-bis(p-hydroxyphenyl)propane having an epoxy equivalency of 2, 10 parts by weight of diethylene triamine, 10 parts by weight of methyl ethyl ketone and 1 part by weight of a block copolymer having the formula:

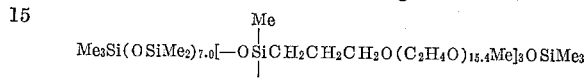

The coating composition is applied to a steel plate as a coating using a 10 mil drawdown blade. The coating is cured by allowing it to stand at room temperature for 24 hours to produce a hard, infusable coating. The coating composition is observed to wet the steel surface better than an otherwise identical block copolymer-free coating composition.

*Example IV*

An alkyd resin is produced by reacting stoichiometric amounts of phthalic acid and ethylene glycol (one-COOH group per —OH group). The resin (50 parts by weight) is emulsified with 50 parts by weight of water containing caesin as an emulsifying agent and 0.5 part by weight of the block copolymer described in Example III. The emulsion is milled with titanium dioxide (30 parts by weight), flake mica (10 parts by weight) and silica (100 parts by weight) to produce a paint. The presence of the block copolymer enhances the stability of the emulsion and aids in securing the compatibility of the emulsion and the other ingredients.

*Example V*

By adding 0.1 part by weight of either of the block copolymers described in Example II to 100 parts by weight of a solution formed by dissolving 5 parts by weight of gamma-aminopropyltriethoxysilane in 95 parts by weight of water there is produced an improved silver-coating composition (e.g. possessing improved wetting properties).

*Example VI*

Two compositions of this invention (Compositions A and B) are prepared by mixing the following components:

| Component | Amount (parts by weight) | |
| --- | --- | --- |
| | Composition A | Composition B |
| Vinyl Chloride Polymer [1] | 17.5 | 15.0 |
| Titanium Dioxide [2] | 11.3 | 0.0 |
| Aluminum Powder [2] | 0.0 | 6.7 |
| Dioctyl Phthalate (plasticizer) | 1.3 | 1.5 |
| Tricresyl Phosphate (plasticizer) | 2.5 | 0.0 |
| Methyl Isobutyl Ketone (solvent) | 33.1 | 38.4 |
| Toluene (diluent) | 33.1 | 38.4 |
| Antimony Oxide [2] | 1.2 | 0.0 |
| Block Copolymer Described in Example I | 0.35 | 0.75 |

[1] A copolymeric vinyl chloride polymer that is composed of 86 parts by weight of copolymerized vinyl chloride per 100 parts by weight of the polymer and 14 parts by weight of copolymerized vinyl acetate per 100 parts by weight of the polymer. It has a specific viscosity of 0.56 (measured using one gram of the polymer dissolved in 100 milliliters of methyl isobutyl ketone).
[2] To render coating opaque.

Compositions A and B are applied to different cold rolled steel surfaces by conventional spray coating methods. The surfaces so treated are allowed to air dry for 30 minutes and were then heated for 15 minutes at 200°

F. to produce adherent coatings. The compositions exhibit improved compatibility and wetting action owing to the presence of the block copolymer.

Examples VII, VIII and IX illustrate antistatic properties imparted to silicone rubber and organic rubber in accordance with the practice of this invention.

An antistatic agent is generally accepted to be a material which reduces the surface resistance of a non-conductive material to a point where an electric charge cannot be accumulated, but is conducted off to ground or dissipated through the moisture or humidity of the atmosphere. This effect is measured by using the material, treated or untreated as the dielectric in a capacitor. One side of the capacitor is grounded and a potential of 7000 volts is applied across the capacitor. The ungrounded electrode is removed and the half-life of the accumulated electrical charge on the grounded, charged, dielectric material is measured. This is an index to the rate of static charge dissipation, and the more rapidly the charge dissipates, the better the antistatic agent property. A test slab of silicone rubber, usually shows a half-life for the induced charge of 35 seconds. Nylon cloth shows a half-life of around 10 seconds, somewhat less prone to accumulate an electric charge. Organic rubber has about the same half-life as silicone rubber. Ideally, a good antistatic agent material would "leak off" (dissipate) the charge as fast as it is induced and, therefore, show a half-life of practically zero, as does cotton or wood at 50% relative humidity.

In Examples VII, VIII and IX, the abbreviations appearing below are used:

*Siloxane A.*—A block copolymer having the formula: $Me_3SiO[MeO(C_2H_4O)_7C_3H_6SiMeO]SiMe_3$.

*Gum Compound I.*—A mixture containing 100 parts by weight of an organopolysiloxane gum (composed of 85 weight percent dimethylsiloxane units, 14.8 weight percent diphenylsiloxane units and 0.2 weight percent methylvinylsiloxane units), 45 parts by weight of a silica filler and 0.7 part by weight of a 50 weight percent mixture of a dimethylpolysiloxane oil and 2,4-dichlorobenzoyl peroxide.

*Gum Compound II.*—A mixture containing 100 parts by weight of an organopolysiloxane gum (composed of 86.0 weight percent dimethylsiloxane units, 13.8 weight percent diphenylsiloxane units and 0.2 weight percent methylvinylsiloxane units), 39 parts by weight of a silica filler and 0.6 part by weight of ditertiary-butyl peroxide.

Example VII

A test slab of cured Gum Compound I (silicone rubber) was found to have a 35 second half-life at 50% relative humidity. Another test slab of the same material, to which two parts per hundred of Siloxane A had been added before curing, was found to have a half-life of less than one second, or practically zero. That is, the induced electrical charge was conducted off the surface to ground approximately as fast as it was applied. On postcuring the latter material in an oven at 350° F. for four hours, there was no evidence of loss of the antistatic agent properties. Also of interest is the fact that the surface resisitivity of the silicone rubber was similarly reduced approximately 30 times by the addition of the Siloxane A to the rubber.

Example VIII

A piece of nylon taffeta cloth was found to have a half-life of 10 seconds for an induced electric charge of 7000 volts at 50% relative humidity. A thin coating of uncured silicone rubber (Gum Compound II), 0.0003 inch thick, was applied in xylene (35 wt.-percent) to each side of the nylon fabric and cured in place. The half-life was now found to correspond to that of the silicone rubber, 35 seconds. The half-life was found to be reduced to 15 seconds by the addition of Siloxane A (1 or 2 parts per 100 parts by weight of Gum Compound II) to the rubber, similarly coated on the nylon.

Another portion of the nylon fabric was treated with a 1% solution of vinyltriethoxysilane and 2% in isopropanol. On evaporation of the solvent, the half-life was found to have been reduced to approximately zero. That is, the electric charge dissipated as fast as it was induced. The silane coated material was further coated with a thin layer of uncured silicone rubber (Gum Compound II) to which two parts per hundred of Siloxane A had been added. After curing, the half-life of a similarly induced electrical charge was also found to have been reduced to practically zero. Failure to first treat the nylon with the antistatic agent before applying the antistatic agent rubber had permitted a charge build-up, but treating the nylon with antistatic agent as well as the rubber coating prevented accumulation of an electrical charge. Severe laundering, even boiling the coated nylon in 1.5% NaOH for 10 minutes, failed to effect the antistatic property acquired by the addition of Siloxane A to the nylon-silicone rubber system.

Example IX

A sample of styrene-butadiene synthetic rubber, compounded with clay and calcium carbonate as a sole stock for tennis shoes and cured as a test slab, was found to have a half-life of 40 seconds for an induced charge. The addition of two parts of Siloxane A to the compound and similarly curing up another test slab, and measuring as before, showed a half-life of an induced charge of approximately zero. On this basis, Siloxane A was found to be an effective antistatic agent for rubber articles, for example, shoe soles, conveyor belting, etc.

Example X

Three batches of a high density polyethylene resin were mixed with 0.3 weight percent, 0.5 weight percent and 1.0 weight percent of Siloxane A (defined above) respectively as follows. The polyethylene was placed in a two-roll mill in which the rollers were maintained at 265° F. The polyethylene was maintained in the mill until it was pliable. Then Siloxane A was added to the polyethylene on the mill over a period of about 5 minutes. The mixture so formed was passed through the mill 10 times and then formed into 6 inch x 8 inch x 75 mil test plaques. The antistatic properties of the test plaques were found to be superior to the antistatic properties of test plaques containing the same amounts of a commercially available mineral oil-polyethylene glycol antistatic agent.

The above experiment was repeated using "Siloxane B." (Siloxane B is a block copolymer corresponding to Formula 5a above where $m$ is 8.5, $n$ is 3.5, $x$ is 25, $y$ is 0, $z$ is 3 and $R''$ is a methyl group.) Again the block copolymer gave improved antistatic properties.

Example XI

In this example, "Siloxane C" designates a block copolymer corresponding to Formula 5a above where $m$ is 8.5, $n$ is 3.5, $x$ is 57, $y$ is 0, $z$ is 3 and $R''$ is a methyl group. One weight percent of Siloxanes B and C were blended with separate batches of a vinylchloride homopolymer (specific viscosity of a solution of 0.2 gram in 100 milliliters nitrobenzene is 0.26) on a roll mill in the manner described in Example X and then formed into test plaques. The antistatic properties of these test plaques were superior to the antistatic properties of a test plaque containing 1 weight percent of a commercially available amine antistatic agent ("Armo-Stat 100-V").

What is claimed is:

1. A coating composition comprising (1) from 1 to 50 parts by weight of a polymeric coating-forming organic compound (2) from 0.001 to 30 parts by weight of a block copolymer composed of (a) at least one siloxane block containing at least two siloxane units represented by the formula:

$$R_bSiO_{4-b/2}$$

wherein R contains from one to about twenty-two carbon atoms inclusive and is selected from the class consisting of monovalent hydrocarbon groups and divalent hydrocarbon groups and $b$ has a value from 1 to 3 inclusive, said siloxane block containing at least one of said siloxane units wherein at least one R group is a divalent hydrocarbon group, and (b) at least one oxyalkylene block containing at least two oxyalkylene groups represented by the formula —R′O—, wherein R′ is an alkylene group containing from two to about ten carbon atoms inclusive, said siloxane and oxyalkylene blocks being interconnected by said divalent hydrocarbon group, and (3) from 20 to 98.999 parts by weight of a liquid diluent selected from the group consisting of water and liquid organic diluents, said parts by weight being based on 100 parts by weight of the composition, said copolymer containing from 5 to 95 parts by weight of siloxane blocks per 100 parts per weight of the copolymer and from 5 to 95 parts by weight of the oxyalkylene blocks per 100 parts by weight of the copolymer.

2. The coating composition of claim 1 wherein the block copolymer is selected from the group consisting of:
A. copolymers comprising units having the formula:

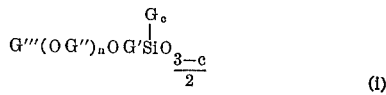  (i)

wherein G′′′ is a member selected from the group consisting of the hydrogen atom and the monovalent hydrocarbon group, G′′ is an alkylene radical containing at least two carbon atoms, G′ is a divalent hydrocarbon radical, G is a monovalent hydrocarbon group, $n$ has a value of at least 4 and $c$ has a value from 0 to 2 inclusive;

B. copolymers comprising units having the formula:

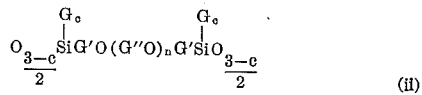  (ii)

wherein G′, G′′, G, $n$ and $c$ have the above-defined meanings; and

C. copolymers comprising units having the formula:

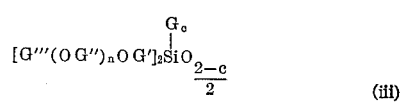  (iii)

wherein G′′′, G′′, G′, G and $n$ have the above-defined meanings and $c$ has a value from 0 to 1 inclusive, each of said copolymers containing from 5 to 95 parts by weight of siloxane blocks per 100 parts per weight of the copolymer and from 5 to 95 parts by weight of the oxyalkylene blocks per 100 parts by weight of the copolymer.

3. The composition of claim 2 wherein the copolymer consists essentially of both (A) units selected from the group consisting of the units defined by Formulas i, ii and iii in claim 2 and units having the formula:

$$R_bSiO_{4-b/2} \quad (iv)$$

wherein R is a monovalent hydrocarbon group and $b$ has a value from 1 to 3 inclusive.

4. The composition of claim 1 wherein the organic compound capable of forming a polymeric coating is an epoxy compound.

5. The composition of claim 1 wherein the organic compound capable of forming a polymeric coating is an amino-alkylsiloxane wherein the amino group is attached to the silicon atom through at least three carbon atoms of the alkyl group.

6. The composition of claim 1 wherein the organic compound capable of forming a polymeric coating is the reaction product of an epoxy compound and an aminoalkylsiloxane wherein the amino group is attached to the silicon atom through at least three carbon atoms of the alkyl group.

7. The composition of claim 1 wherein the organic compound capable of forming a polymeric coating is a vinyl halide polymer.

8. The composition of claim 1 wherein the organic compound capable of forming a polymeric coating is a vinyl chloride polymer.

9. The composition of claim 1 wherein the organic compound capable of forming a polymeric coating is an alkyd resin.

10. The composition of claim 1 wherein the polymeric coating-forming organic compound is an olefinic polymer.

11. The composition of claim 1 wherein the organic compound capable of forming a polymeric coating is polyethylene.

12. The composition of claim 1 wherein the polymeric coating-forming organic compound is an organopolysiloxane gum.

13. A process for coating a metal surface, which process comprises applying to the surface the composition of claim 1 and curing the composition on the surface to produce a coating on the surface.

14. A process for coating a ceramic surface, which process comprises applying to the surface the composition of claim 1 and curing the composition on the surface to produce a coating on the surface.

15. A process for coating a wood surface, which process comprises applying to the surface the composition of claim 1 and curing the composition on the surface to produce a coating on the surface.

16. The coated surface produced in accordance with the process of claim 13.

17. The composition of claim 1 wherein the organic compound capable of forming a polymeric coating is an organopolysiloxane gum consisting essentially of groups having the formula:

wherein R is a member selected from the group consisting of the monovalent hydrocarbon groups free of olefinic unsaturation, the cyano-substituted monovalent hydrocarbon groups free of olefinic unsaturation and the halogen-substituted monovalent hydrocarbon groups free of olefinic unsaturation and R′ is a member selected from the group consisting of R and the olefinically unsaturated monovalent hydrocarbon groups.

18. The composition of claim 1 wherein the block copolymer has the formula:

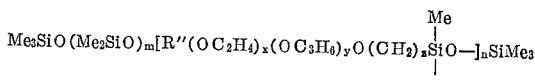

wherein Me is a methyl group, $m$ has a value from 0 to 25 inclusive, $n$ has a value from 1 to 10 inclusive, $x$ has a value from 4 to 60 inclusive, $y$ has a value from 0 to 25 inclusive, $z$ has a value from 2 to 3 inclusive and R′′ is an alkyl group containing from 1 to 4 carbon atoms inclusive.

19. A mixture of a major amount of a polymeric coating-forming organic compound and a minor amount of a block copolymer as defined in claim 1.

20. A mixture comprising a major amount of polyethylene and a minor amount of a block copolymer as defined in claim 18.

21. A mixture comprising a major amount of an organopolysiloxane gum consisting essentially of groups having the formula:

wherein R is a member selected from the group consisting of the monovalent hydrocarbon groups free of olefinic unsaturation, the cyano-substituted monovalent hydrocarbon groups free of olefinic unsaturation and the halogen-substituted monovalent hydrocarbon groups free of olefinic unsaturation and R' is a member selected from the group consisting of R and the olefinically unsaturated monovalent hydrocarbon groups, and a minor amount of a block copolymer as defined in claim 18.

22. A product produced by curing the mixture of claim 19.

23. A product produced by curing the mixture of claim 20.

24. A product produced by curing the mixture of claim 21.

25. A method for producing shaped bodies of solid olefin polymers having enhanced anti-static properties which consists essentially of preparing an admixture of an olefin polymer and from about 0.001 to about 30 parts by weight, based on 100 parts by weight of said polymer, of a block copolymer as defined in claim 1 and thereafter thermoforming the resulting admixture.

26. A method in accordance with claim 25 wherein the olefin polymer is polyethylene.

27. A method in accordance with claim 25 wherein the olefin polymer is a vinyl halide polymer.

28. A process for improving the anti-static properties of a solid olefin polymer which consists essentially of applying to the outer surface of the polymer an effective amount of a block copolymer as defined in claim 1.

29. The product produced by the process of claim 28.

30. A process for improving the anti-static properties of a solid polyethylene resin which consists essentially of applying to the outer surface of the polyethylene an effective amount of a block copolymer as defined in claim 18.

31. The product of the process of claim 30.

References Cited by the Examiner

UNITED STATES PATENTS

| | | | |
|---|---|---|---|
| 2,804,440 | 8/1957 | Brown | 260—29.2 |
| 2,834,748 | 5/1958 | Bailey et al. | 260—29.2 |
| 2,884,388 | 4/1959 | Hedlund | 260—825 |
| 3,061,558 | 10/1962 | Alter | 260—2.5 |

MURRAY TILLMAN, *Primary Examiner.*

J. C. BLEUTGE, *Assistant Examiner.*